United States Patent
Hamamoto et al.

(10) Patent No.: US 11,604,879 B2
(45) Date of Patent: Mar. 14, 2023

(54) ATTESTATION SYSTEM, ATTESTATION METHOD, AND ATTESTATION PROGRAM

(71) Applicant: NEC CORPORATION, Tokyo (JP)

(72) Inventors: Ryo Hamamoto, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 16/629,738

(22) PCT Filed: Jul. 12, 2017

(86) PCT No.: PCT/JP2017/025415
§ 371 (c)(1),
(2) Date: Jan. 9, 2020

(87) PCT Pub. No.: WO2019/012626
PCT Pub. Date: Jan. 17, 2019

(65) Prior Publication Data
US 2020/0233963 A1 Jul. 23, 2020

(51) Int. Cl.
*G06F 21/57* (2013.01)
(52) U.S. Cl.
CPC ................................ *G06F 21/57* (2013.01)
(58) Field of Classification Search
CPC ................................................... G06F 21/57
See application file for complete search history.

(56) References Cited

U.S. PATENT DOCUMENTS

| | | | |
|---|---|---|---|
| 10,338,818 B1* | 7/2019 | Sobel | G06F 3/0641 |
| 2005/0221766 A1* | 10/2005 | Brizek | H04W 12/108 |
| | | | 455/73 |
| 2011/0202992 A1* | 8/2011 | Xiao | H04L 9/3263 |
| | | | 726/10 |
| 2013/0298242 A1* | 11/2013 | Kumar | G06F 21/564 |
| | | | 726/25 |
| 2014/0173686 A1* | 6/2014 | Kgil | H04L 63/205 |
| | | | 726/1 |
| 2014/0201841 A1 | 7/2014 | Deshpande et al. | |
| 2016/0140342 A1 | 5/2016 | Chai et al. | |
| 2017/0098086 A1 | 4/2017 | Hoernecke et al. | |
| 2017/0126647 A1* | 5/2017 | Zhang | H04L 63/08 |

(Continued)

FOREIGN PATENT DOCUMENTS

| | | |
|---|---|---|
| JP | 2006-72856 A | 3/2006 |
| JP | 2014-75841 A | 4/2014 |

(Continued)

OTHER PUBLICATIONS

Communication dated Aug. 18, 2020, from the Japanese Patent Office in Application No. 2019-529374, English Translation.

(Continued)

*Primary Examiner* — Beemnet W Dada
(74) *Attorney, Agent, or Firm* — Sughrue Mion, PLLC (57) ABSTRACT

An attestation system 80 includes a trustworthiness calculation unit 81 and an attestation unit 82. The trustworthiness calculation unit 81 calculates trustworthiness determined based on a state of a component, a method of attestation, or a result of attestation, for the component. The attestation unit 82 performs attestation of the component based on the trustworthiness.

11 Claims, 7 Drawing Sheets

(56) References Cited

U.S. PATENT DOCUMENTS

2017/0287233 A1* 10/2017 Nix .......................... G07C 5/08

FOREIGN PATENT DOCUMENTS

| JP | 2014-102862 A | 6/2014 |
| JP | 2014-229127 A | 12/2014 |

OTHER PUBLICATIONS

Moreno Ambrosin et al., "SANA: Secure and Scalable Aggregate Network Attestation", Proc. ACM-CCS 2016, Oct. 2016, 12 pgs.
N. Asokan et al., "SEDA: Scalable Embedded Device Attestation", Proc. ACM-CCS 2015, Oct. 2015, 12 pgs.
Arvind Seshadri et al., "Pioneer: Verifying Code Integrity and Enforcing Untampered Code Execution on Legacy Systems", Proc. ACM SOSP 2005, 2005, 16 pgs.
International Search Report for PCT/JP2017/025415 dated, Oct. 10, 2017 (PCT/ISA/210), English translation.

\* cited by examiner

ATTESTATION SYSTEM, ATTESTATION METHOD, AND ATTESTATION PROGRAM

CROSS REFERENCE TO RELATED APPLICATIONS

This application is a National Stage of International Application No. PCT/JP2017/025415 filed Jul. 12, 2017.

TECHNICAL FIELD

The present invention relates to an attestation system, an attestation method, and an attestation program for performing attestation of a component.

BACKGROUND ART

In an Internet of Things (IoT) system such as a Smart city, various components (constituents of the IoT system such as devices, gateways, and clouds) generate data, and transmit the generated data to store destinations using various paths.

There is a possibility that an unauthorized component intrudes into such a system. The unauthorized component, having intruded into the system, may perform unauthorized acts such as tapping of and tampering with data distributed in the system. Further, the unauthorized component may use up all resources of authorized components in the system, and as a result cause the system to halt. To prevent these threats, a platform for achieving a secure IoT system is required.

For example, a method of determining whether a component that has entered a system is an unauthorized component by performing attestation is known. In some cases, however, after the component is attested once, the component is completely trusted, and is not subjected to attestation more than once. The situation of the component changes over time. Accordingly, even when the trust relationship is established once, there is no guarantee that the trust relationship holds thereafter.

The types and properties of components and processes that run therein range widely. For example, regarding devices which are an example of components, a device provided with a trusted execution environment (TEE) is likely to maintain authenticity, but a device without secure support is unlikely to maintain authenticity.

Moreover, the situation of a device typically changes over time. For example, a device driver or an internal process may be infected with malware. The situation of a device also changes dynamically, in the case where software is downloaded by drive-by download or the like without the knowledge of the user. Such an unauthorized device that has changed to malicious operation during system operation needs to be detected.

For example, Patent Literature (PTL) 1 describes a method of platform validation and management. Specifically, PTL 1 describes a method by which a cyclic re-verification schedule is determined depending on device use frequency, a module in a device executes re-verification at determined intervals, and a network executes re-verification in the case where re-verification is necessary for security reasons.

PTL 2 describes a method of promptly detecting migrations or changes of unauthorized files. With the method described in PTL 2, the cycle of monitoring files is calculated based on attack information, malware presence information, statistical information of active periods, and the like.

Various methods of attestation are known. For example, Non Patent Literature (NPL) 1 and NPL 2 describe merging authentication results of a plurality of devices and transmitting them to an authentication server to achieve attestation for the plurality of devices.

CITATION LIST

Patent Literatures

PTL 1: Japanese Patent Application Laid-Open No. 2014-075841.
PTL 2: Japanese Patent Application Laid-Open No. 2014-229127.

Non Patent Literatures

NPL 1: N. Asokan, et. al., "SEDA: Scalable embedded device attestation", Proc. ACM-CCS 2015, 2015.
NPL 2: M. Ambrosin, et. al., "SANA: Secure and scalable aggregate network attestation", Proc. ACM-CCS 2016, 2016.

SUMMARY OF INVENTION

Technical Problem

By using the method described in PTL 1, component attestation can be performed cyclically. With the method described in PTL 1, however, it is impossible to follow environment changes and component changes, and therefore it is difficult to perform attestation at appropriate timing.

With the method described in PTL 2, too, monitoring is performed cyclically. Moreover, the method described in PTL 2 uses only information obtainable by observation of a network. It is thus difficult to determine, from the viewpoint of attestation to be performed or from the viewpoint of a component as a target of attestation, whether the component needs to be attested.

NPL 1 and NPL 2 also fail to take into account the possibility that a device becomes malicious during operation.

The present invention therefore has an object of providing an attestation system, an attestation method, and an attestation program that can perform attestation of a component at appropriate timing depending on the situation.

Solution to Problem

An attestation system according to the present invention includes: a trustworthiness calculation unit which calculates trustworthiness determined based on a state of a component, a method of attestation, or a result of attestation, for the component; and an attestation unit which performs attestation of the component based on the trustworthiness.

An attestation method according to the present invention includes: calculating trustworthiness determined based on a state of a component, a method of attestation, or a result of attestation, for the component; and performing attestation of the component based on the calculated trustworthiness.

An attestation program according to the present invention causes a computer to execute: a trustworthiness calculation process of calculating trustworthiness determined based on a state of a component, a method of attestation, or a result of attestation, for the component; and an attestation process of performing attestation of the component based on the trustworthiness.

Advantageous Effects of Invention

According to the present invention, attestation of a component can be performed at appropriate timing depending on the situation.

DESCRIPTION OF EMBODIMENT

Exemplary embodiments of the present invention will be described below, with reference to the drawings.

Exemplary Embodiment 1

Figure 1:
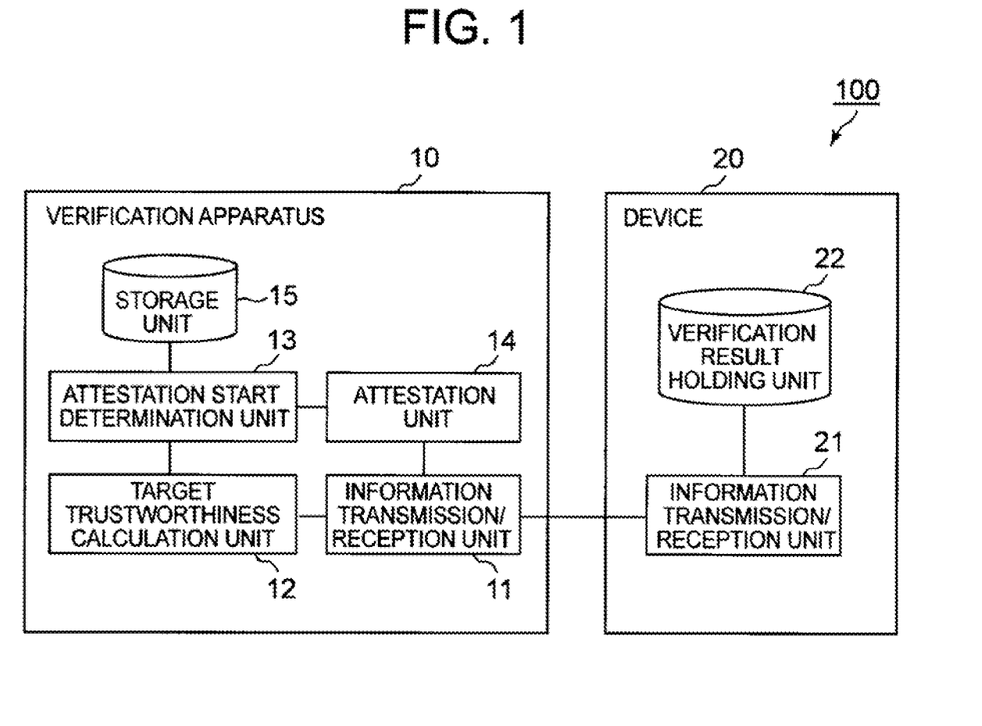
FIG. 1 is a block diagram depicting an example of a structure of Exemplary Embodiment 1 of an attestation system according to the present invention.

FIG. 1 is a block diagram depicting an example of a structure of Exemplary Embodiment 1 of an attestation system according to the present invention. An attestation system 100 according to this exemplary embodiment includes a verification apparatus 10 and a device 20. The verification apparatus 10 is an apparatus for performing attestation of the device 20. The device 20 depicted in FIG. 1 is an example of a component. In this exemplary embodiment, the device 20 is described as a specific mode of a component. The mode of the component is, however, not limited to a device, and may be any component in the system, such as a gateway or a cloud.

The device 20 includes an information transmission/reception unit 21 and a verification result holding unit 22.

The information transmission/reception unit 21 transmits information to the verification apparatus 10 and receives information from the verification apparatus 10. In this exemplary embodiment, the information transmission/reception unit 21 transmits a hash value of the device 20 to the verification apparatus 10. The information transmission/reception unit 21 may transmit the hash value to the verification apparatus 10 any of: when the device 20 enters the system including the verification apparatus 10; on a regular basis; and in response to a request from the verification apparatus 10.

The verification result holding unit 22 holds a verification result received from the below-described verification apparatus 10. The verification result holding unit 22 is implemented, for example, by a memory unit or a magnetic disk unit.

The verification apparatus 10 includes an information transmission/reception unit 11, a target trustworthiness calculation unit 12, an attestation start determination unit 13, an attestation unit 14, and a storage unit 15. The storage unit 15 is a storage unit for storing various data necessary for the below-described processes, and is implemented, for example, by a memory or a magnetic disk unit.

The information transmission/reception unit 11 transmits information to the device 20 and receives information from the device 20. In this exemplary embodiment, the information transmission/reception unit 11 receives the hash value from the device 20, and transmits the verification result by the below-described attestation unit 14.

The target trustworthiness calculation unit 12 calculates trustworthiness of the device 20 as the component. The trustworthiness is an index for determining whether to perform attestation of the component (device 20), and is calculated to be lower in a situation in which attestation is needed more. The trustworthiness is determined based on not only the state of the target component but also the method of attestation, the result of attestation, or the like.

An example of a method of determining the trustworthiness based on the method of attestation is a method of setting the trustworthiness to be lower when attestation is simpler and to be higher when attestation is more complex. For example, the trustworthiness may be decreased in the case where attestation is performed in a layer close to software, and increased in the case where attestation is performed in a layer close to hardware (e.g. TPM (Trusted Platform Module)/TEE).

For example, let Ds be the decrease value of the trustworthiness in the case of verifying the authenticity of the component by software as an example of a simple method, and Dh be the decrease value of the trustworthiness in the case of verifying the authenticity of the component by hardware as an example of a complex method. The target trustworthiness calculation unit 12 may calculate the trustworthiness at the next time by subtracting Ds or Dh from the trustworthiness at the current time.

An example of a method of performing attestation in a layer close to software is described in the following reference literature.

REFERENCE LITERATURE

A. Sechadri et. al., "Pioneer: Verifying code integrity and enforcing untampered code execution on legacy systems", Proc. ACM SOSP 2005, pp. 1-16, 2005.

An example of a method of determining the trustworthiness based on the result of attestation is a method of calculating new trustworthiness depending on the last trustworthiness. In the case where the result of attestation before last indicated that attestation was necessary and the last result of attestation was verified, the target component was attested most recently. The target trustworthiness calculation unit 12 may accordingly calculate high trustworthiness, or calculate the trustworthiness with a smaller decrease value than usual.

For example, in the case where the trustworthiness is expressed as a percent [1, 100], the target trustworthiness calculation unit 12 may calculate the trustworthiness at the next time by multiplying the trustworthiness at the current time by the inverse of the trustworthiness at the last attestation. In the case where the trustworthiness is expressed as a probability [0, 1], the target trustworthiness calculation unit 12 may calculate the trustworthiness at the next time by multiplying the trustworthiness at the current time by the trustworthiness at the last attestation.

Although the method of decreasing the trustworthiness has been described here, the target trustworthiness calculation unit 12 may perform calculation of increasing the trustworthiness. Examples of methods of increasing the trustworthiness include addition of a fixed value, multiplication by a fixed value, exponential increase, return to an initial value, and return to an upper limit.

The initial value denotes trustworthiness given when the component enters the system, and the upper limit denotes a maximum value of trustworthiness which the component can take. The initial value and the upper limit may be values common to all components, or values set for each individual component. The initial value and the upper limit are, for example, calculated by an administrator or the like beforehand based on the strength of security functions implemented in the system or the component, such as whether the component is provided with the TEE or whether attestation is implemented by software or hardware. Specifically, the initial value and the upper limit are determined based on a value obtained by quantifying the security strength. For example, the initial value and the upper limit may be determined using the proportion of security functions implemented in hardware level in all security functions implemented in the component.

The trustworthiness may be determined based on the elapsed time from the last attestation. Since it is typically determined that the need for attestation is higher when the elapsed time is longer, the trustworthiness is calculated to be lower when the elapsed time from when attestation was performed is longer.

The trustworthiness T(t, s) of the device at a given time t is defined here. s denotes the state of the device at the time t, and is an element for determining the trustworthiness. For example, s is expressed as a vector in which the following plurality of elements are arranged. The elements for determining the trustworthiness T are, however, not limited to the following (1) to (5):

(1) the elapsed time from the last attestation
(2) the position (distance) of the device relative to the position of an important structure in the system
(3) the type of CPU
(4) the type of function usable by the device
(5) the number of terminals adjacent to the device.

The i-th element of the vector s is denoted by $s_i$. $s_i$ represents a specific numerical value. In the case of calculating the trustworthiness so that the need for attestation can be determined to be higher when the value of $s_i$ is larger, the trustworthiness T(t, s) can be calculated, for example, using functions indicated by the following Formulas 1 to 3. In Formulas 1 to 3, q(s) is a function that returns a scalar value in response to s, and is, for example, $q(s)=\Sigma w_i s_i$ or $q(s)=\Pi w_i s_i$. In these functions, $w_i$ denotes the weight of $s_i$. Hence, the target trustworthiness calculation unit 12 may calculate the trustworthiness based preferentially on some state $s_i$ depending on the weight.

[Math. 1]

$$T(t, s) = \begin{cases} a^{q(s)} (0 < a < 1) & \text{Formula (1)} \\ \exp(-q(s)) & \text{Formula (2)} \\ 1 - \dfrac{1}{1 + \exp(-q(s))} & \text{Formula (3)} \end{cases}$$

Figure 2:
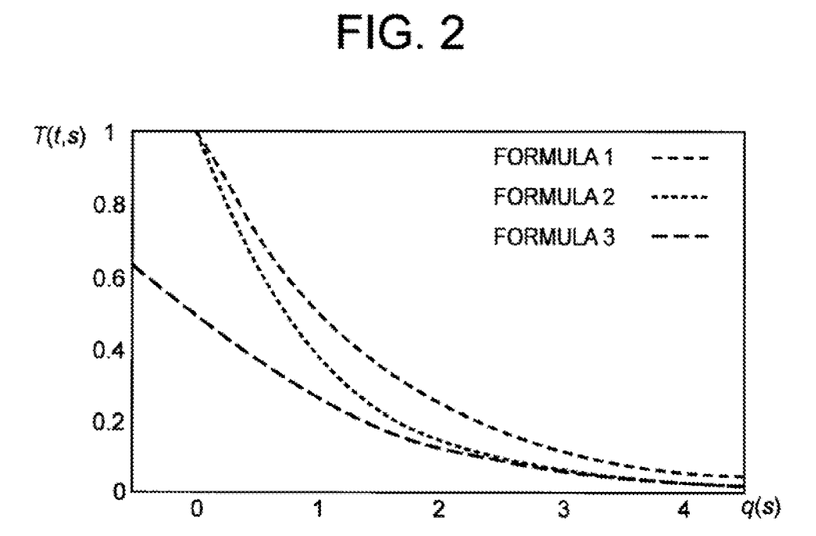
FIG. 2 is an explanatory diagram depicting an example of changes of trustworthiness based on Formulas 1 to 3.

FIG. 2 is an explanatory diagram depicting an example of changes of trustworthiness based on Formulas 1 to 3. The foregoing Formulas 1 to 3 are each a monotonically decreasing function, i.e. a function that decreases trustworthiness if attestation is not performed. In the graph in FIG. 2, a=0.5.

In the example of the element (1), $s_i$ takes a larger value when the elapsed time from the last attestation is longer, and a smaller value when the elapsed time from the last attestation is shorter. This is because the need for attestation is higher when the elapsed time is longer.

In the example of the element (2), $s_i$ takes a larger value when the position of the device relative to the position of the important structure in the system is closer, and a smaller value when the position of the device relative to the position of the important structure in the system is farther. This is because more attention needs to be paid to a device located at a position closer to the important structure.

In the example of the element (3), the value of $s_i$ is changed depending on the type of CPU. For example, the value of $s_i$ may be increased in the case of Intel or ARM, and decreased in the case of PIC (Peripheral Interface Controller). Intel, ARM, and PIC are registered trademarks.

In the example of the element (4), $s_i$ takes a larger value when more types of functions are usable by the device, and a smaller value when fewer types of functions are usable by the device. This is because a device having more functions has a greater chance of being used and thus requires more attention.

In the example of the element (5), $s_i$ takes a larger value when the number of terminals adjacent to the device is larger, and a smaller value when the number of terminals adjacent to the device is smaller. This is because the device is more likely to be affected by adjacent terminals when the number of adjacent terminals is larger.

The foregoing information for calculating the trustworthiness (the type of CPU, the network structure, etc.) is, for example, stored in the storage unit 15. The target trustworthiness calculation unit 12 may inquire the target device about the information for calculating the trustworthiness, or acquire the information from another system (not depicted). The target trustworthiness calculation unit 12 may store the calculated trustworthiness in the storage unit 15.

The attestation start determination unit 13 determines whether to perform attestation, based on the calculated trustworthiness. Specifically, the attestation start determination unit 13 reads a threshold $T_{th}$ stored in the storage unit 15, and determines to perform attestation in the case where the trustworthiness is less than the threshold $T_{t}h$. In the case of determining to perform attestation, the attestation start determination unit 13 instructs the attestation unit 14 to perform attestation of the device 20. More specifically, the attestation start determination unit 13 instructs the attestation unit 14 to start an attestation protocol.

The threshold $T_{th}$ may be a value common to all devices, or a value set for each individual device. The threshold $T_{th}$ is, for example, set by an administrator or the like beforehand based on the required security level of the system or the device, such as the importance of the device or the importance of data flowing through the device.

Specifically, a value obtained by quantifying the security level required of the component by the administrator can be used as the threshold $T_{t}h$. For example, the threshold $T_{t}h$ may be determined using the proportion of components receiving maintenance and the proportion of components to which the latest patch is applied, as described in NIST SP 800-53A and NIST SP 800-55 issued by the National Institute of Standards and Technology (NIST).

The attestation start determination unit 13 may perform a process of recovering the trustworthiness depending on the result of attestation by the below-described attestation unit 14. Specifically, the attestation start determination unit 13 may recover the trustworthiness in the case where it is determined as a result of attestation that the component is normal (i.e. has no problems) (specifically, a state in which the correct hash value of data composed of binaries etc. with respect to an internal process of the component matches the hash value transmitted from the component). Herein, to recover the trustworthiness means to increase the trustworthiness, and is achieved by, for example, adding a constant value to the trustworthiness, multiplying the trustworthiness by a constant, multiplying the trustworthiness by an exponent, or returning the trustworthiness to the initial value.

The initial value denotes the trustworthiness given when the component enters the system, and the upper limit denotes the maximum value of trustworthiness which the component can take. The initial value and the upper limit may be values common to all components, or values set for each individual component. The recovered trustworthiness may be used, for example, as an element when calculating the trustworthiness next time.

The threshold $T_{th}$ may be a fixed value, or a time-dependent value. The threshold $T_{th}$ may be calculated using the recovered trustworthiness. By fixing the threshold, the recovery amount, the decrease amount, and the like, attestation can be performed cyclically. By dynamically changing the decrease amount or the recovery amount of the trustworthiness or by making the threshold time-dependent, attestation can be performed non-cyclically.

The attestation unit 14 performs attestation based on the instruction of the attestation start determination unit 13. Any method of attestation is used. The method of attestation may be a widely known method. The attestation unit 14 transmits the verification result to the information transmission/reception unit 11.

Subsequently, the information transmission/reception unit 11 transmits the verification result to the device 20. The information transmission/reception unit 21 in the device 20 receives the verification result, and registers the verification result in the verification result holding unit 22.

The information transmission/reception unit 11, the target trustworthiness calculation unit 12, the attestation start determination unit 13, and the attestation unit 14 are realized by a CPU of a computer operating according to a program (attestation program).

For example, the program may be stored in the storage unit 15, with the CPU reading the program and, according to the program, operating as the information transmission/reception unit 11, the target trustworthiness calculation unit 12, the attestation start determination unit 13, and the attestation unit 14. The information transmission/reception unit 11, the target trustworthiness calculation unit 12, the attestation start determination unit 13, and the attestation unit 14 may each be realized by dedicated hardware.

Figure 3:
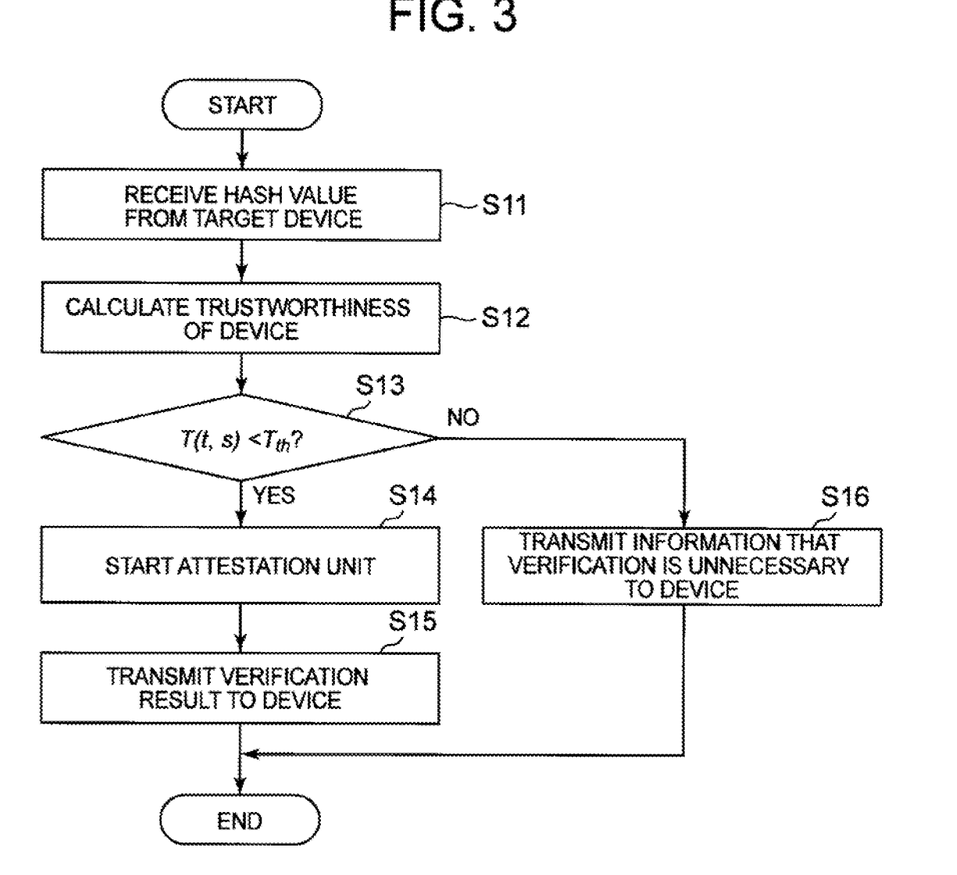
FIG. 3 is a flowchart depicting an example of operation of the attestation system according to Exemplary Embodiment 1.

Operation of the attestation system according to this exemplary embodiment will be described below. FIG. 3 is a flowchart depicting an example of operation of the attestation system according to Exemplary Embodiment 1.

The verification apparatus 10 (more specifically, the information transmission/reception unit 11) receives the hash value from the device 20 as a target of attestation (step S11). The target trustworthiness calculation unit 12 calculates the trustworthiness $T(t, s)$ of the device 20 (step S12). The attestation start determination unit 13 determines whether the calculated trustworthiness $T(t, s)$ is less than the threshold $T_{th}$ (step S13).

In the case where $T(t, s) < T_{th}$ holds (step S13: Yes), the attestation start determination unit 13 starts the attestation unit 14, and instructs the attestation unit 14 to perform attestation of the device 20 (step S14). The information transmission/reception unit 11 then transmits the result of attestation by the attestation unit 14 to the device 20 (step S15). In the case where $T(t, s) < T_{th}$ does not hold (step S13: No), the information transmission/reception unit 11 transmits information that verification is unnecessary to the device 20 (step S16).

As described above, in this exemplary embodiment, the target trustworthiness calculation unit 12 calculates, for the component, the trustworthiness determined based on the state of the component, the method of attestation, or the result of attestation, and the attestation start determination unit 13 and the attestation unit 14 perform the attestation of the component based on the calculated trustworthiness. Thus, the attestation of the component can be performed at appropriate timing depending on the situation. This makes it possible to promptly detect an unauthorized device that has changed to malicious operation during operation.

This exemplary embodiment describes the method by which the target trustworthiness calculation unit 12 calculates the trustworthiness at the timing of receiving the hash value from the device 20. Alternatively, while monitoring the elapsed time from the last attestation of the target component (device 20), the target trustworthiness calculation unit 12 may calculate the trustworthiness as appropriate. Then, in the case where the attestation start determination unit 13 determines that the trustworthiness is less than the threshold, the attestation unit 14 may perform the attestation.

A modification of the attestation system according to Exemplary Embodiment 1 will be described below. Exemplary Embodiment 1 describes the method by which the target trustworthiness calculation unit 12 calculates the trustworthiness based on the state of the target component, the method of attestation, or the result of attestation. This modification describes a method by which the trustworthiness is determined using the situation of a network.

Figure 4:
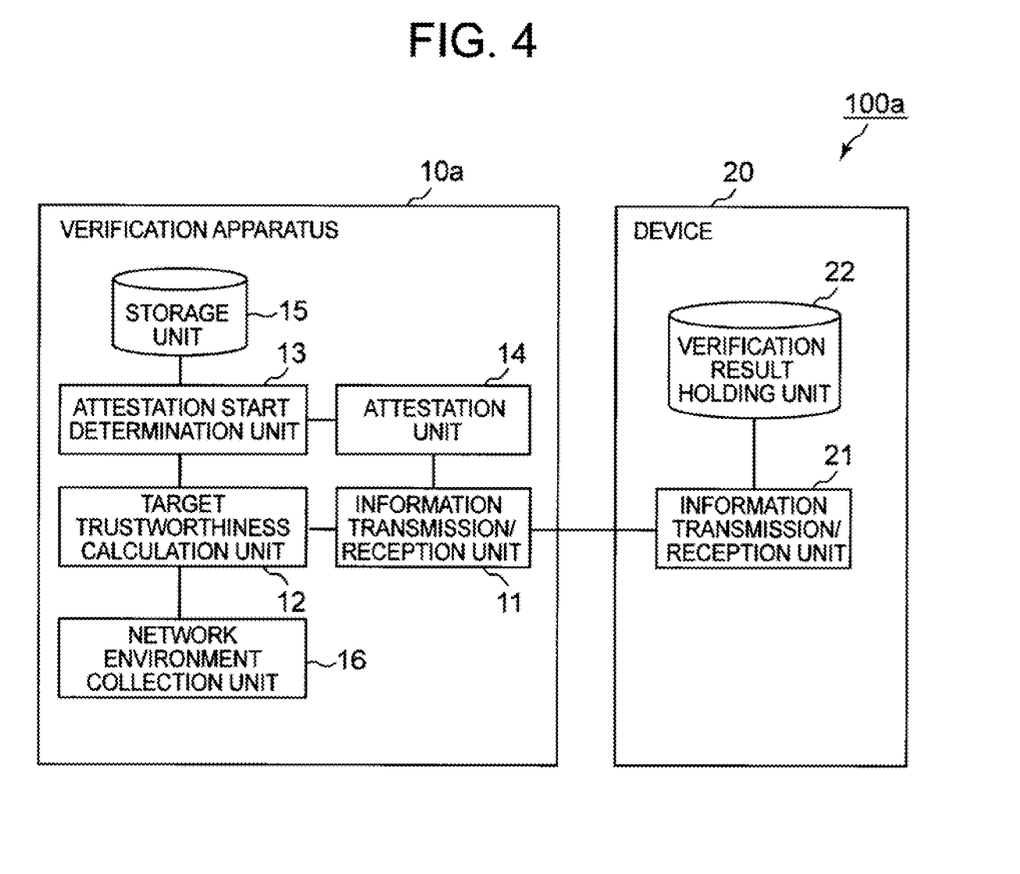
FIG. 4 is a block diagram depicting a modification of the attestation system according to Exemplary Embodiment 1.

FIG. 4 is a block diagram depicting the modification of the attestation system according to Exemplary Embodiment 1. An attestation system 100a according to this modification includes a verification apparatus 10a and a device 20. The device 20 is the same as that in Exemplary Embodiment 1.

The verification apparatus 10a includes an information transmission/reception unit 11, a target trustworthiness calculation unit 12, an attestation start determination unit 13, an attestation unit 14, a storage unit 15, and a network environment collection unit 16. The information transmission/reception unit 11, the attestation start determination unit 13, the attestation unit 14, and the storage unit 15 are the same as those in Exemplary Embodiment 1.

The network environment collection unit 16 collects environment information of a communication network to which the target component is connected. Examples of the environment information of the communication network include packet loss rate, network delay, and jitter.

The target trustworthiness calculation unit 12 calculates the trustworthiness by the method described in Exemplary Embodiment 1. The target trustworthiness calculation unit 12 further corrects the calculated trustworthiness based on the collected information. That is, the target trustworthiness calculation unit 12 corrects the trustworthiness depending on the environment of the communication network to which the target component is connected.

The target trustworthiness calculation unit 12 may correct the trustworthiness of the target component to be lower when the environment of the communication network deteriorates more. For example, in the case where the communication network has a long delay, the target trustworthiness calculation unit 12 may multiply the trustworthiness decrease amount by $\alpha$ ($\alpha$>1). Consequently, the trustworthiness is more likely to fall below the threshold, so that an authentication request can be made in advance (the number of times authentication is performed can be increased).

The information transmission/reception unit 11, the target trustworthiness calculation unit 12, the attestation start determination unit 13, the attestation unit 14, and the network environment collection unit 16 are realized by a CPU of a computer operating according to a program (attestation program).

Figure 5:
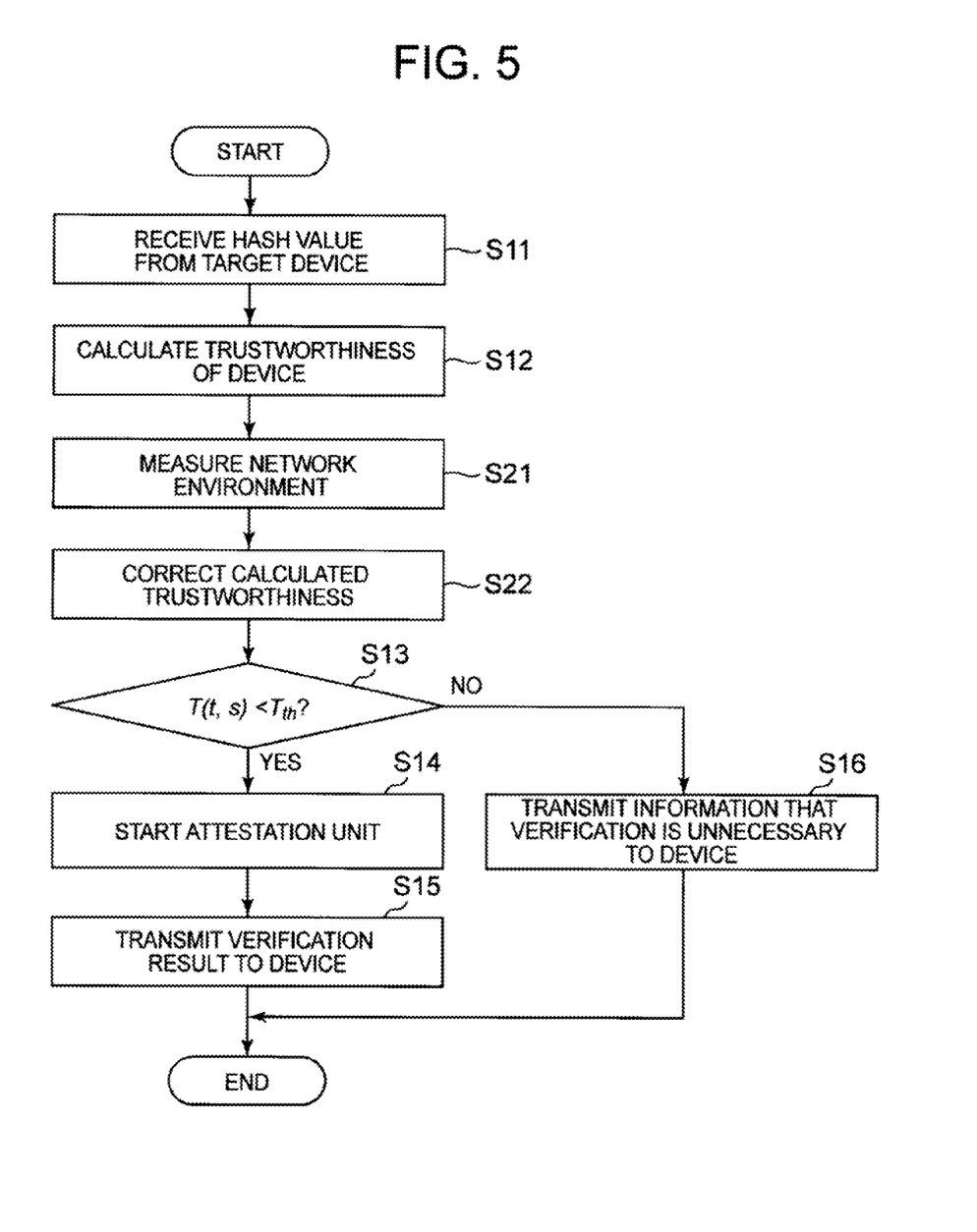
FIG. 5 is a flowchart depicting an example of operation of the attestation system according to the modification of Exemplary Embodiment 1.

Operation of the attestation system according to this modification will be described below. FIG. 5 is a flowchart depicting an example of operation of the attestation system according to the modification of Exemplary Embodiment 1. The process of receiving the hash value from the device 20 and calculating the trustworthiness is the same as the process of steps S11 to S12 in FIG. 3.

The network environment collection unit 16 measures the network environment (step S21). Specifically, the network environment collection unit 16 collects environment information of the communication network to which the target component is connected. The target trustworthiness calculation unit 12 then corrects the calculated trustworthiness based on the collected information (step S22). The subsequent process of comparing the trustworthiness with the threshold to determine whether to verify the component is the same as the process of steps S13 to S16 in FIG. 3.

As described above, in this modification, the network environment collection unit 16 collects environment information of the communication network to which the component as a target of attestation is connected, and the target trustworthiness calculation unit 12 corrects the calculated trustworthiness based on the collected information. Hence, the accuracy in detecting an unauthorized device that has changed to malicious operation during device operation can be improved, in addition to the effects in Exemplary Embodiment 1.

Exemplary Embodiment 2

Exemplary Embodiment 2 of an attestation system according to the present invention will be described below. Exemplary Embodiment 1 describes the case where trustworthiness calculation is performed only in the verification apparatus. This exemplary embodiment describes the case where calculation of part of trustworthiness is also performed on the device side.

Figure 6:
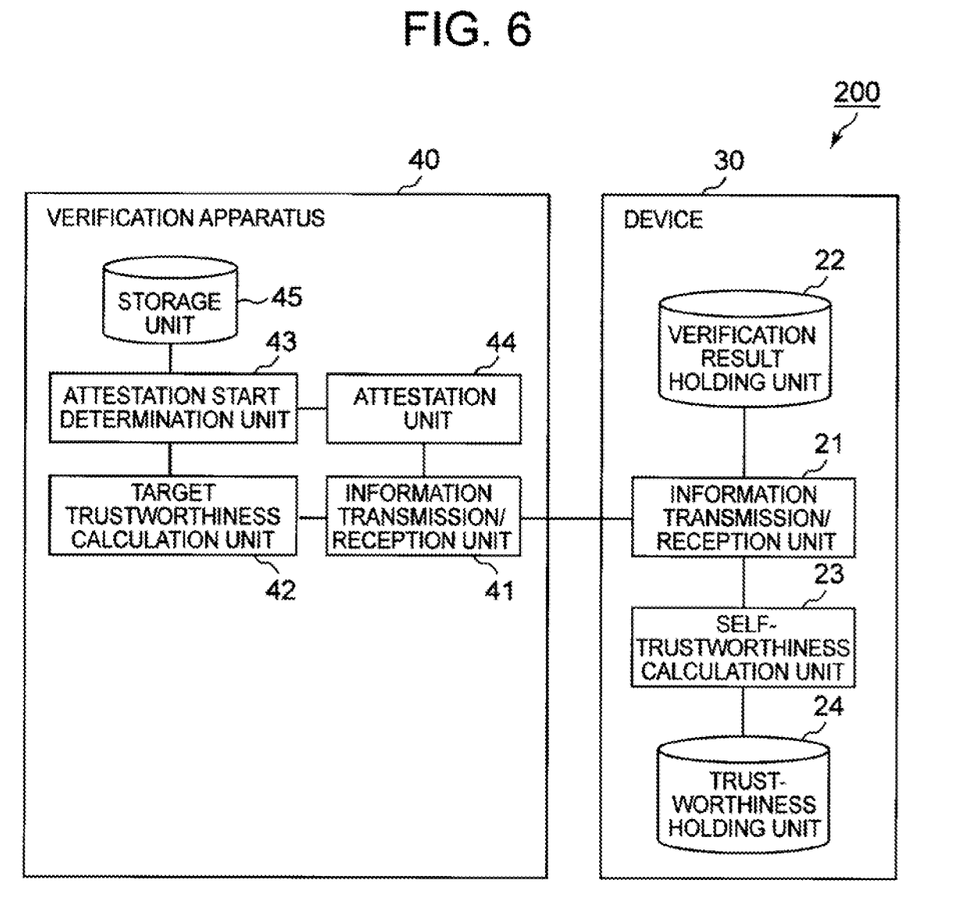
FIG. 6 is a block diagram depicting an example of a structure of Exemplary Embodiment 2 of an attestation system according to the present invention.

FIG. 6 is a block diagram depicting an example of a structure of Exemplary Embodiment 2 of an attestation system according to the present invention. An attestation system 200 according to this exemplary embodiment includes a verification apparatus 40 and a device 30. The device 30 depicted in FIG. 6 is an example of a component, as in Exemplary Embodiment 1. In this exemplary embodiment, the device 30 is described as a specific mode of a component. The mode of the component is, however, not limited to a device, and may be any component in the system such as a gateway or a cloud.

The device 30 includes an information transmission/reception unit 21, a verification result holding unit 22, a self-trustworthiness calculation unit 23, and a trustworthiness holding unit 24. The verification result holding unit 22 is the same as that in Exemplary Embodiment 1.

The trustworthiness holding unit 24 holds trustworthiness of the device 30. The trustworthiness held in the trustworthiness holding unit 24 is the trustworthiness at the last attestation.

The self-trustworthiness calculation unit 23 calculates trustworthiness of the device 30. The trustworthiness calculation method may be any method. For example, the self-trustworthiness calculation unit 23 may calculate the trustworthiness by the same method as the method of calculation by the target trustworthiness calculation unit 12. The self-trustworthiness calculation unit 23 may calculate the trustworthiness based on part of the elements, and cause the target trustworthiness calculation unit 42 in the verification apparatus 40 to correct the transmitted trustworthiness.

The information transmission/reception unit 21 transmits the calculated trustworthiness to the verification apparatus 40. The information transmission/reception unit 21 may also transmit various information indicating the situation of the device 30, in addition to the trustworthiness.

In the case where the trustworthiness is transmitted from the device 30, the self-trustworthiness calculation unit 23 updates the trustworthiness stored in the trustworthiness holding unit 24 with the transmitted trustworthiness.

The verification apparatus 40 includes an information transmission/reception unit 41, a target trustworthiness calculation unit 42, an attestation start determination unit 43, an attestation unit 44, and a storage unit 45. The verification apparatus 40 may include the network environment collection unit 16 described in the modification of Exemplary Embodiment 1.

The information transmission/reception unit 41 transmits information to the device 30 and receives information from the device 30. In this exemplary embodiment, the information transmission/reception unit 41 receives the trustworthiness from the device 30, and transmits a verification result by the below-described attestation unit 44. The information transmission/reception unit 41 may transmit trustworthiness calculated by the below-described target trustworthiness calculation unit 42 or trustworthiness recovered by the attestation start determination unit 43, to the device 30.

The target trustworthiness calculation unit 42 calculates trustworthiness of the device 30 as the component. In this exemplary embodiment, the trustworthiness is transmitted from the device 30. The target trustworthiness calculation unit 42 accordingly calculates the trustworthiness, also using the trustworthiness received from the device 30. For example, the trustworthiness calculated in the device 30 is based on information (e.g. CPU information) that can be acquired by the device 30. Hence, the target trustworthiness calculation unit 42 may calculate the trustworthiness based on the method of attestation or the elapsed time from the last attestation.

The attestation start determination unit 43 determines whether to perform attestation, based on the calculated trustworthiness. The method of determining whether to perform attestation is the same as the method by the attestation start determination unit 13 in Exemplary Embodiment 1.

The attestation start determination unit 43 may perform a process of recovering the trustworthiness depending on the result of attestation by the below-described attestation unit 44, as with the attestation start determination unit 13 in Exemplary Embodiment 1.

The attestation unit 44 performs attestation of the target component (device 30), as with the attestation unit 14 in Exemplary Embodiment 1.

The information transmission/reception unit 41, the target trustworthiness calculation unit 42, the attestation start determination unit 43, and the attestation unit 44 are realized by a CPU of a computer operating according to a program (attestation program).

Figure 7:
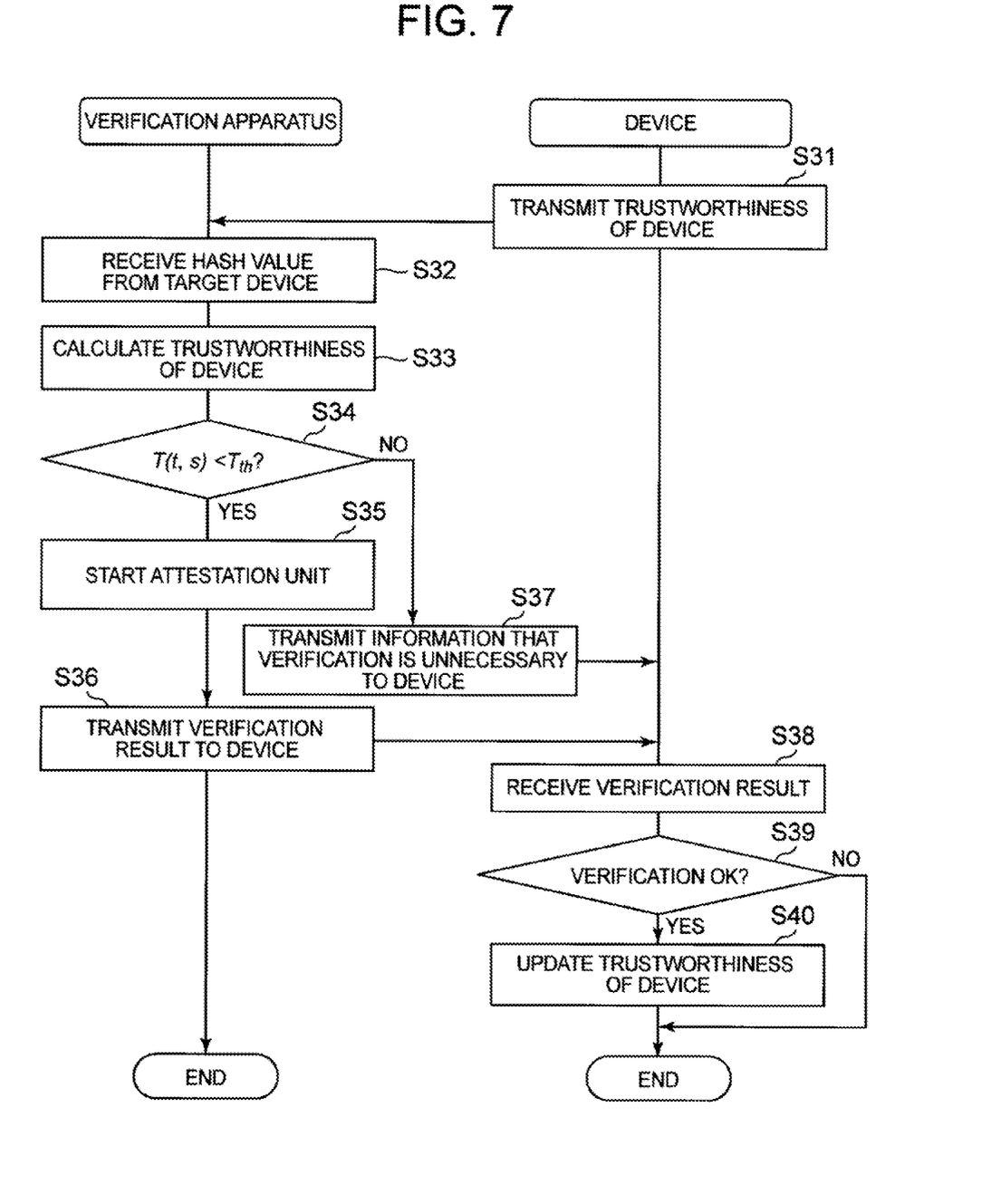
FIG. 7 is a flowchart depicting an example of operation of the attestation system according to Exemplary Embodiment 2.

An example of operation of the attestation system according to this exemplary embodiment will be described below. FIG. 7 is a flowchart depicting an example of operation of the attestation system according to Exemplary Embodiment 2.

The information transmission/reception unit 21 in the device 30 transmits the trustworthiness of the device 30 to the verification apparatus 40 (step S31). The information transmission/reception unit 41 in the verification apparatus 40 receives the trustworthiness from the device 30 (step S32). The target trustworthiness calculation unit 42 calculates the trustworthiness of the device 30, also using the received trustworthiness (step S33).

The attestation start determination unit 43 determines whether the calculated trustworthiness T(t, s) is less than the threshold $T_{th}$ (step S34). In the case where T(t, s)<$T_{th}$ holds (step S34: Yes), the attestation start determination unit 43 starts the attestation unit 44, and instructs the attestation unit 44 to perform attestation of the device 30 (step S35).

The information transmission/reception unit 41 then transmits the result of attestation by the attestation unit 44 to the device 30 (step S36). Here, the information transmission/reception unit 41 may also transmit the trustworthiness calculated by the target trustworthiness calculation unit 42 or the trustworthiness recovered by the attestation start determination unit 43 to the device 30.

In the case where T(t, s)<$T_{th}$ does not hold (step S34: No), the information transmission/reception unit 41 transmits information that verification is unnecessary to the device 30 (step S37). The information transmission/reception unit 21 in the device 30 receives the result of attestation (step S38). The information transmission/reception unit 21 may also receive the trustworthiness from the verification apparatus 40.

In the case where the result of attestation is OK (i.e. indicates that the component is normal) (step S39: Yes), the self-trustworthiness calculation unit 23 updates the trustworthiness of the device 30 (step S40). In the case where the result of attestation is not OK (i.e. indicates that the component is not normal) (step S39: No), the device 30 ends the process.

As described above, in this exemplary embodiment, the device 30 as a target of verification (more specifically, the self-trustworthiness calculation unit 23) calculates the trustworthiness of the device 30, and the target trustworthiness calculation unit 42 calculates the trustworthiness of the device 30 based on the trustworthiness calculated by the device 30. Hence, trustworthiness that better reflects the information of the device 30 itself can be calculated, in addition to the effects in Exemplary Embodiment 1.

Figure 8:
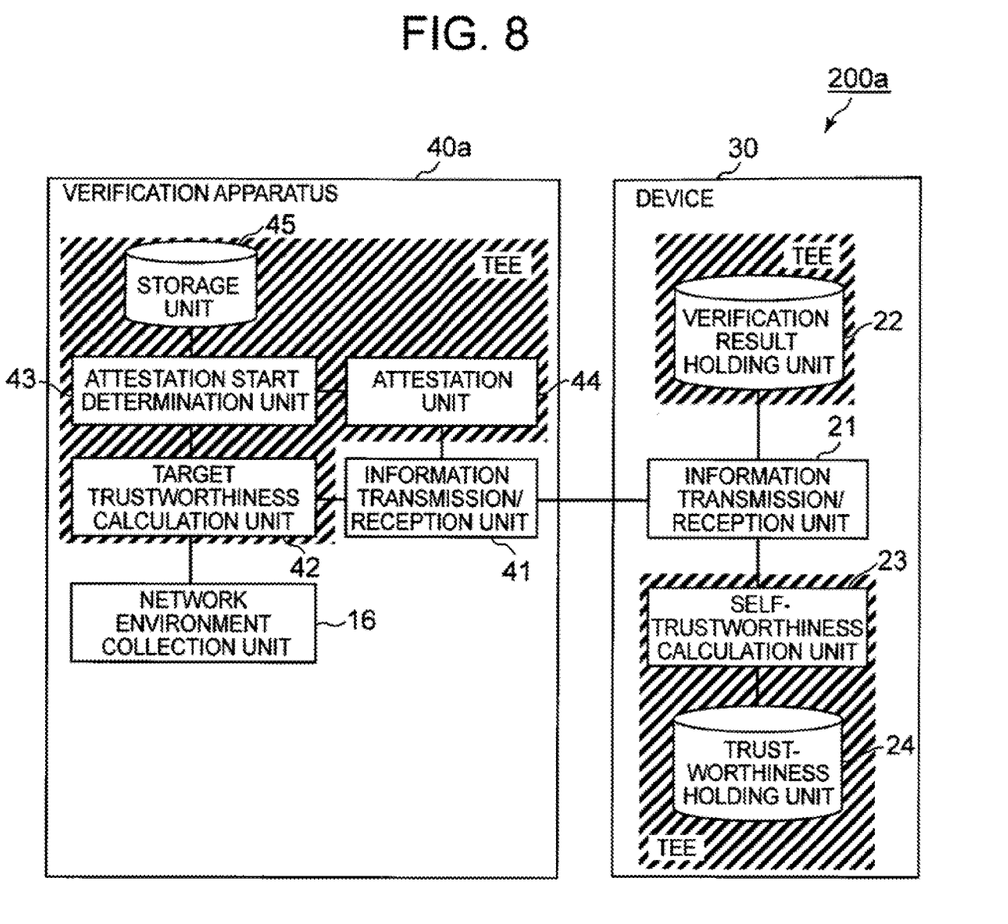
FIG. 8 is an explanatory diagram depicting an example of a specific structure of an attestation system.

A specific example according to the present invention will be described below. This specific example describes a method of operating each unit securely by a TEE. FIG. 8 is an explanatory diagram depicting an example of a structure of an attestation system in this specific example. An attestation system 200a depicted in FIG. 8 has the structure of the attestation system 200 in Exemplary Embodiment 2 to which the network environment collection unit 16 in the modification of Exemplary Embodiment 1 has been added. That is, a verification apparatus 40a depicted in FIG. 8 includes the network environment collection unit 16 in addition to the structure included in the verification apparatus 40 in Exemplary Embodiment 2.

As depicted in FIG. 8, the target trustworthiness calculation unit 42, the attestation start determination unit 43, the attestation unit 44, and the storage unit 45 in the verification apparatus 40a are made secure by the TEE. Likewise, the verification result holding unit 22, the self-trustworthiness calculation unit 23, and the trustworthiness holding unit 24 in the device 30 are made secure by the TEE.

By providing security by the TEE, tampering with or leakage of the trustworthiness or the threshold, tampering with the function of calculating the trustworthiness, etc. can be prevented. That is, with the structure in this specific example, an unauthorized device that has changed to malicious operation during device operation can be detected more securely.

Figure 9:
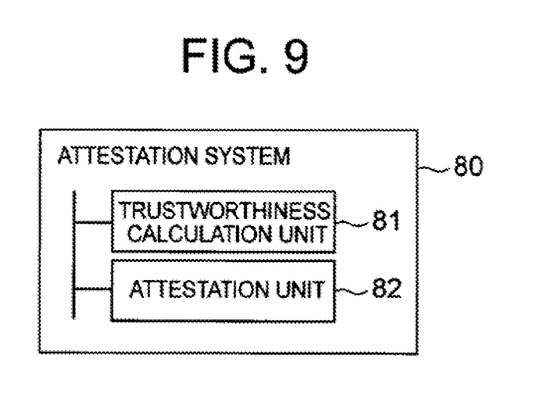
FIG. 9 is a block diagram depicting an overview of an attestation system according to the present invention.

An overview of the present invention will be described below. FIG. 9 is a block diagram depicting an overview of an attestation system according to the present invention. An attestation system 80 according to the present invention includes: a trustworthiness calculation unit 81 (e.g. the target trustworthiness calculation unit 12) which calculates trustworthiness determined based on a state of a component (e.g. the device 20), a method of attestation, or a result of attestation, for the component; and an attestation unit 82 (e.g. the attestation start determination unit 13 and the attestation unit 14) which performs attestation of the component based on the trustworthiness.

With such a structure, the attestation of the component can be performed at appropriate timing depending on the situation.

The trustworthiness calculation unit 81 may calculate the trustworthiness determined based on an elapsed time from last attestation.

The attestation system 80 may include a network environment collection unit (e.g. the network environment collection unit 16) which collects environment information of a communication network to which the component as a target of attestation is connected. The trustworthiness calculation unit 81 may correct the calculated trustworthiness based on the collected information. With such a structure, the trustworthiness can be calculated based also on the environment to which the component is connected, so that the attestation can be performed more appropriately.

The trustworthiness calculation unit 81 may calculate the trustworthiness of the component, using trustworthiness of the component calculated by the component. With such a structure, trustworthiness that better reflects information of the component can be calculated.

Specifically, the trustworthiness calculation unit 81 may calculate, based on the method of attestation, the trustworthiness to be lower when attestation is simpler, and to be higher when attestation is more complex.

The foregoing exemplary embodiments can be wholly or partially described as the following supplementary notes, but the structures of the present invention are not limited to the following structures.

(Supplementary note 1) An attestation system including: a trustworthiness calculation unit which calculates trustworthiness determined based on a state of a component, a method of attestation, or a result of attestation, for the component; and an attestation unit which performs attestation of the component based on the trustworthiness.

(Supplementary note 2) The attestation system according to supplementary note 1, wherein the trustworthiness calculation unit calculates the trustworthiness determined based on an elapsed time from last attestation.

(Supplementary note 3) The attestation system according to supplementary note 1 or 2, including a network environment collection unit which collects environment information of a communication network to which the component as a target of attestation is connected, wherein the trustworthiness calculation unit corrects the calculated trustworthiness based on the collected information.

(Supplementary note 4) The attestation system according to any one of supplementary notes 1 to 3, wherein the trustworthiness calculation unit calculates the trustworthiness of the component, using trustworthiness of the component calculated by the component.

(Supplementary note 5) The attestation system according to any one of supplementary notes 1 to 4, wherein the trustworthiness calculation unit calculates, based on the method of attestation, the trustworthiness to be lower when attestation is simpler, and to be higher when attestation is more complex.

(Supplementary note 6) An attestation method including: calculating trustworthiness determined based on a state of a component, a method of attestation, or a result of attestation, for the component; and performing attestation of the component based on the calculated trustworthiness.

(Supplementary note 7) The attestation method according to supplementary note 6, wherein the trustworthiness determined based on an elapsed time from last attestation is calculated.

(Supplementary note 8) An attestation program for causing a computer to execute: a trustworthiness calculation process of calculating trustworthiness determined based on a state of a component, a method of attestation, or a result of attestation, for the component; and an attestation process of performing attestation of the component based on the trustworthiness.

(Supplementary note 9) The attestation program according to supplementary note 8, causing the computer to, in the trustworthiness calculation process, calculate the trustworthiness determined based on an elapsed time from last attestation.

REFERENCE SIGNS LIST 10, 10a, 40, 40a verification apparatus
20, 30 device
11, 41 information transmission/reception unit
12, 42 target trustworthiness calculation unit
13, 43 attestation start determination unit
14, 44 attestation unit
15, 45 storage unit
16 network environment collection unit
21 information transmission/reception unit
22 verification result holding unit
23 self-trustworthiness calculation unit
24 trustworthiness holding unit
100, 100a, 200, 200a attestation system

The invention claimed is:

1. An attestation system comprising a hardware processor configured to execute a software code to:
calculate trustworthiness determined based on a state of a component, a method of attestation, or a result of attestation, for the component itself;
perform attestation of the component in the case where the trustworthiness is less than a predetermined threshold; and
calculate trustworthiness of the component, using trustworthiness of the component calculated by the component,
wherein the trustworthiness is an index for determining whether to perform attestation of the component.

2. The attestation system according to claim 1, wherein the hardware processor is configured to execute a software code to calculate the trustworthiness determined based on an elapsed time from last attestation.

3. The attestation system according to claim 1, wherein the hardware processor is configured to execute a software code to:
collect environment information of a communication network to which the component as a target of attestation is connected; and
correct the calculated trustworthiness based on the collected information.

4. The attestation system according to claim 1, wherein the hardware processor is configured to execute a software code to calculate, based on the method of attestation, the trustworthiness to be lower when attestation is simpler, and to be higher when attestation is more complex.

5. An attestation method comprising:
calculating trustworthiness determined based on a state of a component, a method of attestation, or a result of attestation, for the component itself;
performing attestation of the component in the case where the trustworthiness is less than a predetermined threshold; and
calculating trustworthiness of the component, using trustworthiness of the component calculated by the component,
wherein the trustworthiness is an index for determining whether to perform attestation of the component.

6. The attestation method according to claim 5, wherein the trustworthiness determined based on an elapsed time from last attestation is calculated.

7. A non-transitory computer readable information recording medium storing an attestation program, when executed by a processor, that performs a method for:
calculating trustworthiness determined based on a state of a component, a method of attestation, or a result of attestation, for the component itself;
performing attestation of the component in the case where the trustworthiness is less than a predetermined threshold; and
calculating trustworthiness of the component, using trustworthiness of the component calculated by the component,
wherein the trustworthiness is an index for determining whether to perform attestation of the component.

8. A non-transitory computer readable information recording medium according to claim 7, wherein the trustworthiness determined based on an elapsed time from last attestation is calculated.

9. The attestation system according to claim 1, wherein the trustworthiness calculation unit calculates the trustworthiness of the component, also using trustworthiness calculated based on information that can be acquired by the component itself.

10. The attestation system according to claim 1, wherein the trustworthiness calculation unit calculates the trustworthiness of the component, also using trustworthiness calculated based on CPU information that can be acquired by the component itself.

11. The attestation system according to claim 1, wherein the hardware processor is configured to execute a software code to calculate trustworthiness of the component based on information that can be acquired by the component itself.

* * * * *